United States Patent [19]

Ersoz et al.

[11] Patent Number: 5,287,189
[45] Date of Patent: Feb. 15, 1994

[54] DISPLAYING AN INTERLACED VIDEO SIGNAL WITH A NONINTERLACED VIDEO SIGNAL

[75] Inventors: Nathaniel H. Ersoz, Brownsburg; Timothy W. Saeger, Indianapolis, both of Ind.

[73] Assignee: Thomson Consumer Electronics, Inc., Indianapolis, Ind.

[21] Appl. No.: 933,284

[22] Filed: Aug. 21, 1992

[51] Int. Cl.⁵ .................... H04N 5/46; H04N 7/01; H04N 5/45
[52] U.S. Cl. .................... 348/588; 348/441
[58] Field of Search .................... 358/183, 140, 22; H04N 7/01, 5/45, 5/46

[56] References Cited

U.S. PATENT DOCUMENTS

| | | | |
|---|---|---|---|
| 4,163,992 | 8/1979 | Inaba et al. | 358/183 |
| 4,249,213 | 2/1981 | Imaide et al. | 358/183 |
| 4,266,242 | 5/1981 | McCoy | 358/22 |
| 4,281,345 | 7/1981 | Wärn | 358/149 |
| 4,282,546 | 8/1981 | Reitmeier | 358/22 |
| 4,680,630 | 7/1987 | Field | 358/160 |
| 4,689,681 | 8/1987 | Jackson | 358/183 |
| 4,724,487 | 2/9188 | Casey | 358/183 |
| 4,760,455 | 7/1988 | Nagashima | 358/242 |
| 4,839,728 | 6/1989 | Casey | 358/183 |
| 4,862,269 | 8/1989 | Sonoda et al. | 358/160 |
| 4,878,117 | 10/1989 | Ikehira et al. | 358/183 |
| 4,914,509 | 4/1990 | Idei | 358/183 X |
| 4,935,815 | 6/1990 | Ichikawa et al. | 358/140 |
| 4,976,089 | 1/1989 | Imai et al. | 358/183 |
| 4,984,081 | 1/1991 | Miyoshi et al. | 358/180 |
| 4,984,083 | 1/1991 | Okamoto et al. | 358/183 |
| 4,987,493 | 1/1991 | Canfield et al. | 358/183 |
| 4,992,874 | 2/1991 | Willis et al. | 358/183 |
| 5,021,887 | 6/1991 | Park | 358/183 |
| 5,025,496 | 6/1991 | Canfield | 358/153 |
| 5,027,212 | 6/1991 | Marlton et al. | 358/183 |
| 5,065,346 | 11/1991 | Kawai et al. | 358/183 X |
| 5,091,784 | 2/1992 | Someya et al. | 358/183 |
| 5,138,455 | 8/1992 | Okumura et al. | 358/22 X |
| 5,208,660 | 5/1993 | Yoshida | 358/22 |

FOREIGN PATENT DOCUMENTS

| | | | |
|---|---|---|---|
| 411662 | 2/1991 | European Pat. Off. | H04N 5/45 |
| 459409 | 12/1991 | European Pat. Off. | H04N 5/45 |
| 61-214873 | 9/1986 | Japan | H04N 5/46 |
| 3-154581 | 7/1991 | Japan | H04N 5/46 |

*Primary Examiner*—Mark R. Powell
*Attorney, Agent, or Firm*—Joseph S. Tripoli; Joseph J. Laks; Harvey D. Fried

[57] ABSTRACT

A video display unit and deflection system are synchronized with a first video signal. A detecting circuit determines whether the first video signal has more than one field type. A second video signal has more than one field type. A multiplexer combines the first and a second video signals for a simultaneous video display. A video signal processor is responsive to the detecting circuit and has two modes of operation. In a first mode of operation, when the first video signal has more than one field type, all fields of the second video signal are an output to the multiplexer. In a second mode of operation, when the first video signal has only one field type, only one field type of the second video signal is an output to the multiplexer. The video signal processor has a memory for storing the second video signal. Only one field type of the video signal is written into and read from the memory during the second mode of operation. Each field written into the memory during the second mode of operation is read out twice to the multiplexer.

16 Claims, 12 Drawing Sheets

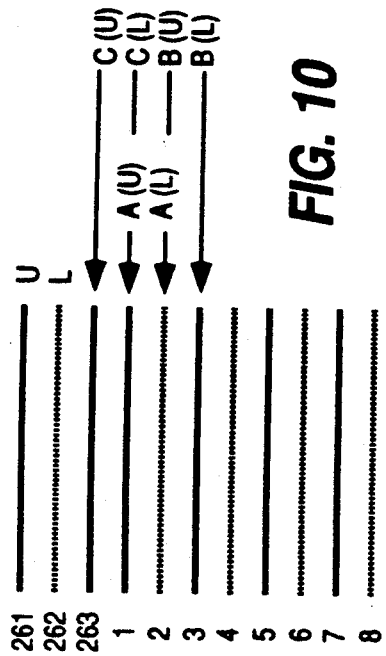
| MODE | DECISION EDGE POSITION |
|---|---|
| A | $2 \leq POS < 1$ |
| B | $3 \leq POS < 2$ |
| C | $1 \leq POS < 263$ |
FIG. 9
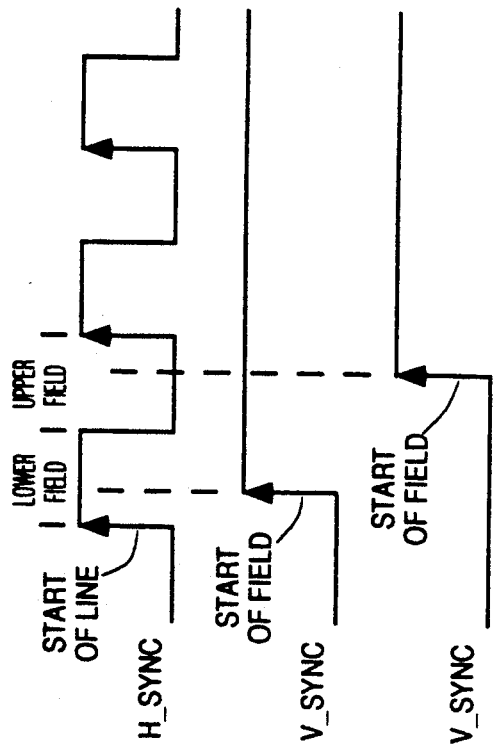

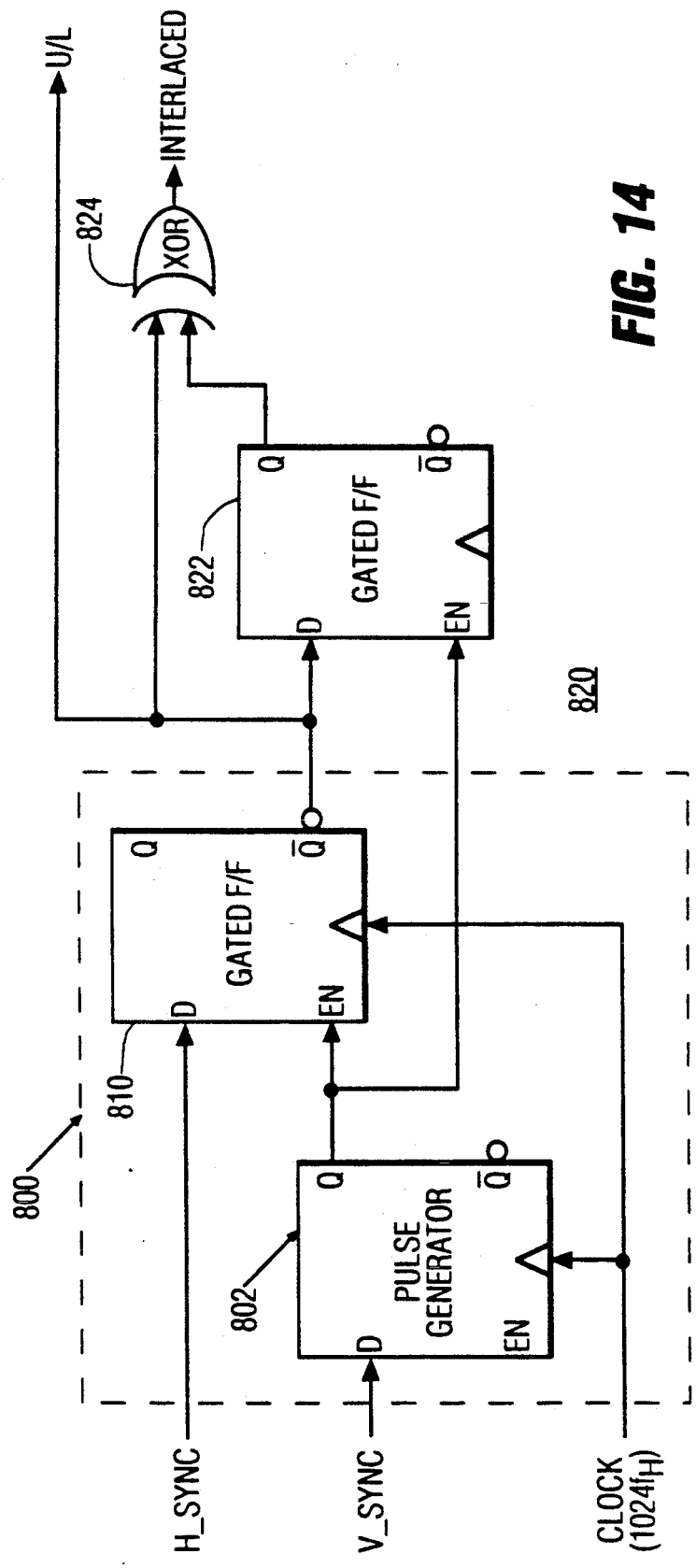

DISPLAYING AN INTERLACED VIDEO SIGNAL WITH A NONINTERLACED VIDEO SIGNAL

The invention relates to the field of televisions having multiple picture displays for asynchronous video signals, and in particular, to such televisions having a wide display format ratio screen. Most televisions today have a format display ratio, horizontal width to vertical height, of 4:3. A wide format display ratio corresponds more closely to the display format ratio of movies, for example 16:9. The invention is applicable to both direct view televisions and projection televisions.

Televisions having a format display ratio of 4:3, often referred to as 4×3, are limited in the ways that single and multiple video signal sources can be displayed. Television signal transmissions of commercial broadcasters, except for experimental material, are broadcast with a 4×3 format display ratio. Many viewers find the 4×3 display format less pleasing than the wider format display ratio associated with the movies. Televisions with a wide format display ratio provide not only a more pleasing display, but are capable of displaying wide display format signal sources in a corresponding wide display format. Movies "look" like movies, not cropped or distorted versions thereof. The video source need not be cropped, either when converted from film to video, for example with a telecine device, or by processors in the television.

Televisions with a wide display format ratio are also suited to a wide variety of displays for both conventional and wide display format signals, as well as combinations thereof in multiple picture displays. However, the use of a wide display ratio screen entails numerous problems. Changing the display format ratios of multiple signal sources, developing consistent timing signals from asynchronous but simultaneously displayed sources, switching between multiple sources to generate multiple picture displays, and providing high resolution pictures from compressed data signals are general categories of such problems. Such problems are solved in a wide screen television according to this invention. A wide screen television according to the various aspects of this invention is capable of providing high resolution, single and multiple picture displays, from single and multiple asynchronous sources having similar or different format ratios, and with selectable display format ratios.

Maintaining interlace integrity of the auxiliary channel video is a problem stemming from reading and writing of the FIFO in the auxiliary signal path asynchronously relative to the main signal. Since the display is locked to the main channel video, the current field type being displayed, that is the upper or lower field, will be determined by the main signal. The field type which is stored in a video RAM memory in the auxiliary signal path or channel for synchronization with the main signal, and ready to be read out at the start of the main channel field, may or may not be the same as the displayed field type. It may be necessary to change the auxiliary signal field type stored in the video RAM to match that of the main channel display.

Generally, a digitizing process for an NTSC signal will quantize 262.5 line fields of the NTSC signal into 263 line upper fields (U, also referred to as odd fields) and 262 line lower fields (L, also referred to as even fields). This is due to fact that vertical sync is sampled with pulses representing horizontal sync. The upper fields include odd lines 1 through 263. The lower fields include even lines 2 through 262. As the main and auxiliary channel signals precess, the U/L field type will change with respect to the auxiliary channel field type indicators. A field reversing circuit can change the field type of the second video signal when necessary to match the field type of the first video signal to maintain interlace integrity in the combined display.

Another problem can occur when the main video source is a noninterlaced source, as can be the case with certain video games and computers, and the auxiliary video source is an interlaced source, again because the display is locked to the main signal. A noninterlaced display will not display alternate fields in alternate interlaced positions, that is, such that the lines of the respective fields are spatially offset, in between one another. Accordingly, the upper and lower fields of each frame of an auxiliary interlaced source will be displayed directly on top of one another when shown on a noninterlaced display. The interlaced picture will appear vertically smeared, which is generally considered quite objectionable. The problem is compounded in a side by side display, as compared to a small inset picture-in-picture (also referred to as PIP). In a side by side display, the main picture, from the noninterlaced source, and auxiliary picture, from the interlaced source, are of substantially comparable size, and both large by comparison to a typical PIP. This invention solves this problem with a system for displaying signals from noninterlaced video sources on displays locked to signals from noninterlaced video sources. The system is particularly appropriate for multiple video displays as can be arranged on a wide screen television, for example, side by side display of main and auxiliary pictures wherein the main picture originates from a noninterlaced video source and the auxiliary picture originates from an interlaced video source.

In accordance with an inventive arrangement, the presence of a signal from a noninterlaced video source on the main picture channel is detected. Such detection can be implemented by detecting that successive fields have the same field type. The presence of a signal from a noninterlaced source can be used to change the mode of operation of a video RAM and an associated control circuit. In one mode, the video RAM may be used to store successive fields of an auxiliary video signal. These fields may be read out successively when the main picture channel is an interlaced signal.

When the main signal is noninterlaced, the video RAM and control circuit can operate in another mode, wherein only every other field of the auxiliary signal is read from the video RAM and combined with the main signal, even though all fields may still be written into the video RAM. Alternatively, only every other field can be written into the video RAM, and thereafter read from the video RAM. In either case, only upper fields (odd fields) or only lower fields (even fields) will be read from the video RAM. Each of these fields will be read and displayed twice, in the same vertical position. There will be some loss of vertical resolution, but there will be no vertical smearing. Overall, the picture quality of the auxiliary signal will be significantly improved.

The entire process can be controlled by a central control system, for example a microprocessor. The microprocessor can monitor the noninterlaced signal source detector, and in accordance with detection or nondetection, set the operating mode of the video RAM and associated control circuit for supplying all fields of the auxiliary video signal, or only upper or only lower fields of the auxiliary video signal, to the circuit which combined the signals for the simultaneous display.

FIGS. 1(a)-1(f) are useful for explaining different display formats of a wide screen television.

FIGS. 8-10 are useful for explaining a method for maintaining interlace integrity for simultaneously displayed video signals exhibiting relative precession.

Figure 12:
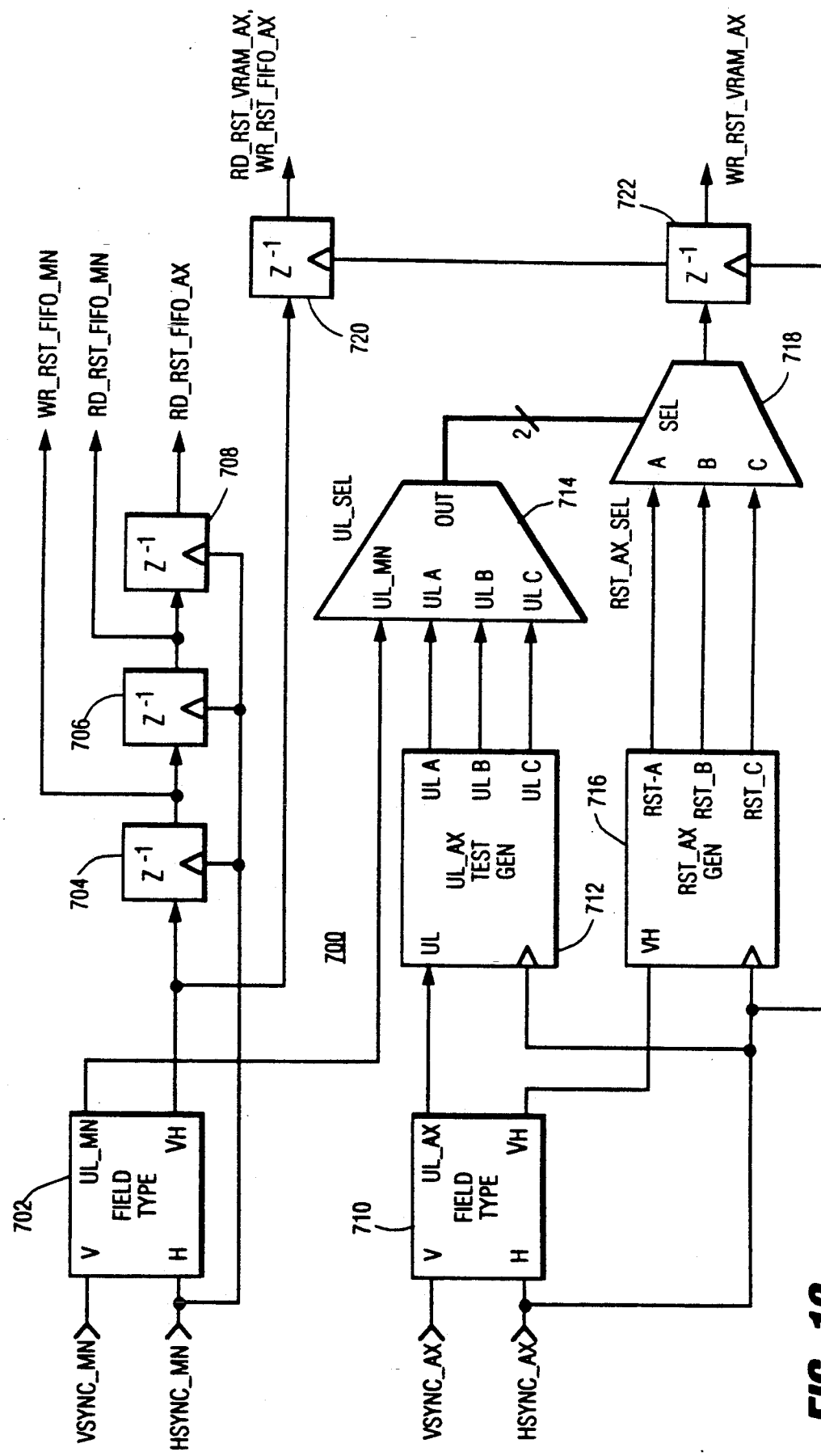

FIGS. 11(a)-11(c) are waveforms useful for explaining the operation of the circuit shown in FIG. 12.

FIG. 12 is a block diagram of a circuit for maintaining interlace integrity as explained in connection with FIGS. 8-11.

The invention taught herein is particularly useful with wide screen televisions, direct and projection, although it can also be implemented in conventional televisions. Accordingly, the invention is illustrated herein as part of a wide screen television. The particular wide screen television shown herein corresponds to the wide screen television described in PCT/US91/03740 (WO 91/19388). A number of details omitted herein for purposes of simplification are explained therein. FIGS. 1(b)-1(f) illustrate some, but not all of the various combinations of single and multiple picture display formats which can be implemented in a wide screen television. For purposes of convenience in illustration and discussion herein, a conventional display format ratio of width to height for a video source or signal is generally deemed to be 4×3, whereas a wide screen display format ratio of width to height for a video source or signal is generally deemed to be 16×9. The inventive arrangements are not limited by these definitions.

Figure 1C:
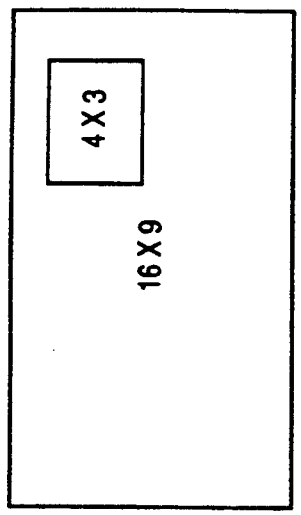
Figure 1F:
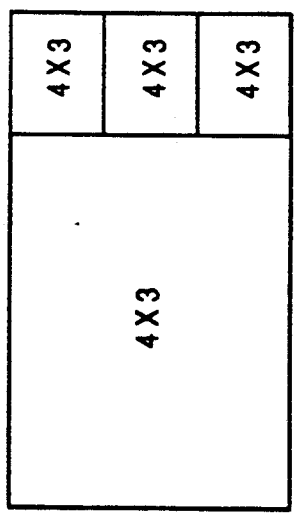
Figure 1B:
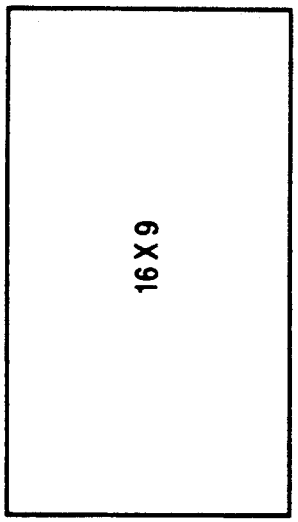
Figure 1E:
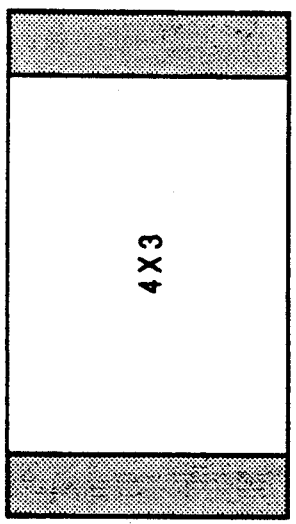
Figure 1A:

FIG. 1(a) illustrates a television, direct view or projection, having a conventional format display ratio of 4×3. When a 16×9 format display ratio picture is transmitted, as a 4×3 format display ratio signal, black bars appear at the top and at the bottom. This is commonly referred to as letterbox format. In this instance, the viewed picture is rather small with respect to the entire available display area. Alternatively, the 16×9 format display ratio source is converted prior to transmission, so that it will fill the vertical extent of a viewing surface of 4×3 format display. However, much information will be cropped from the left and/or right sides. As a further alternative, the letterbox picture can be expanded vertically but not horizontally, whereby the resulting picture will evidence distortion by vertical elongation. None of the three alternatives is particularly appealing.

FIG. 1(b) shows a 16×9 screen. A 16×9 format display ratio video source would be fully displayed, without cropping and without distortion. A 16×9 format display ratio letterbox picture, which is itself in a 4×3 format display ratio signal, can be progressively scanned by line doubling or line addition, so as to provide a larger display with sufficient vertical resolution. A wide screen television in accordance with this invention can display such a 16×9 format display ratio signal whether the main source, the auxiliary source or an external RGB source.

FIG. 1(c) illustrates a 16×9 format display ratio main signal in which a 4×3 format display ratio inset picture is displayed. If both the main and auxiliary video signals are 16×9 format display ratio sources, the inset picture can also have a 16×9 format display ratio. The inset picture can be displayed in many different positions.

Figure 1D:
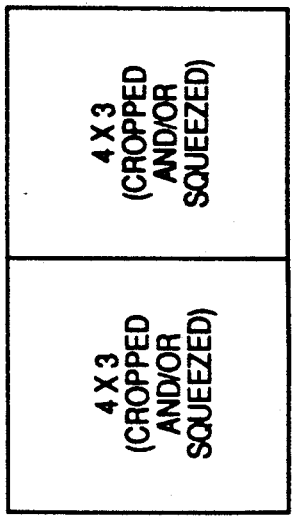

FIG. 1(d) illustrates a display format, wherein the main and auxiliary video signals are displayed with the same size picture. Each display area has an format display ratio of 8×9, which is of course different from both 16×9 and 4×3. In order to show a 4×3 format display ratio source in such a display area, without horizontal or vertical distortion, the signal must be cropped on the left and/or right sides. More of the picture can be shown, with less cropping, if some aspect ratio distortion by horizontal squeezing of the picture is tolerated. Horizontal squeezing results in vertical elongation of objects in the picture. The wide screen television can provide any mix of cropping and aspect ratio distortion from maximum cropping with no aspect ratio distortion to no cropping with maximum aspect ratio distortion.

Data sampling limitations in the auxiliary video signal processing path complicate the generation of a high resolution picture which is as large in size as the display from the main video signal. Various methods can be developed for overcoming these complications.

FIG. 1(e) is a display format wherein a 4×3 format display ratio picture is displayed in the center of a 16×9 format display ratio screen. Dark bars are evident on the right and left sides.

FIG. 1(f) illustrates a display format wherein one large 4×3 format display ratio picture and three smaller 4×3 format display ratio pictures are displayed simultaneously. A smaller picture outside the perimeter of the large picture is sometimes referred to as a POP, that is a picture-outside-picture, rather than a PIP, a picture-in-picture. The terms PIP or picture-in-picture are used herein for both display formats. In those circumstances where the wide screen television is provided with two tuners, either both internal or one internal and one external, for example in a video cassette recorder, two of the displayed pictures can display movement in real time in accordance with the source. The remaining pictures can be displayed in freeze frame format. It will be appreciated that the addition of further tuners and additional auxiliary signal processing paths can provide for more than two moving pictures. It will also be appreciated that the large picture on the one hand, and the three small pictures on the other hand, can be switched in position. Larger numbers of smaller sized POPs can also be generated.

The various formats shown in FIGS. 1(b)-1(f) are illustrative, not limiting, and can be implemented by wide screen televisions shown in the drawings and described in detail below.

Figure 2:
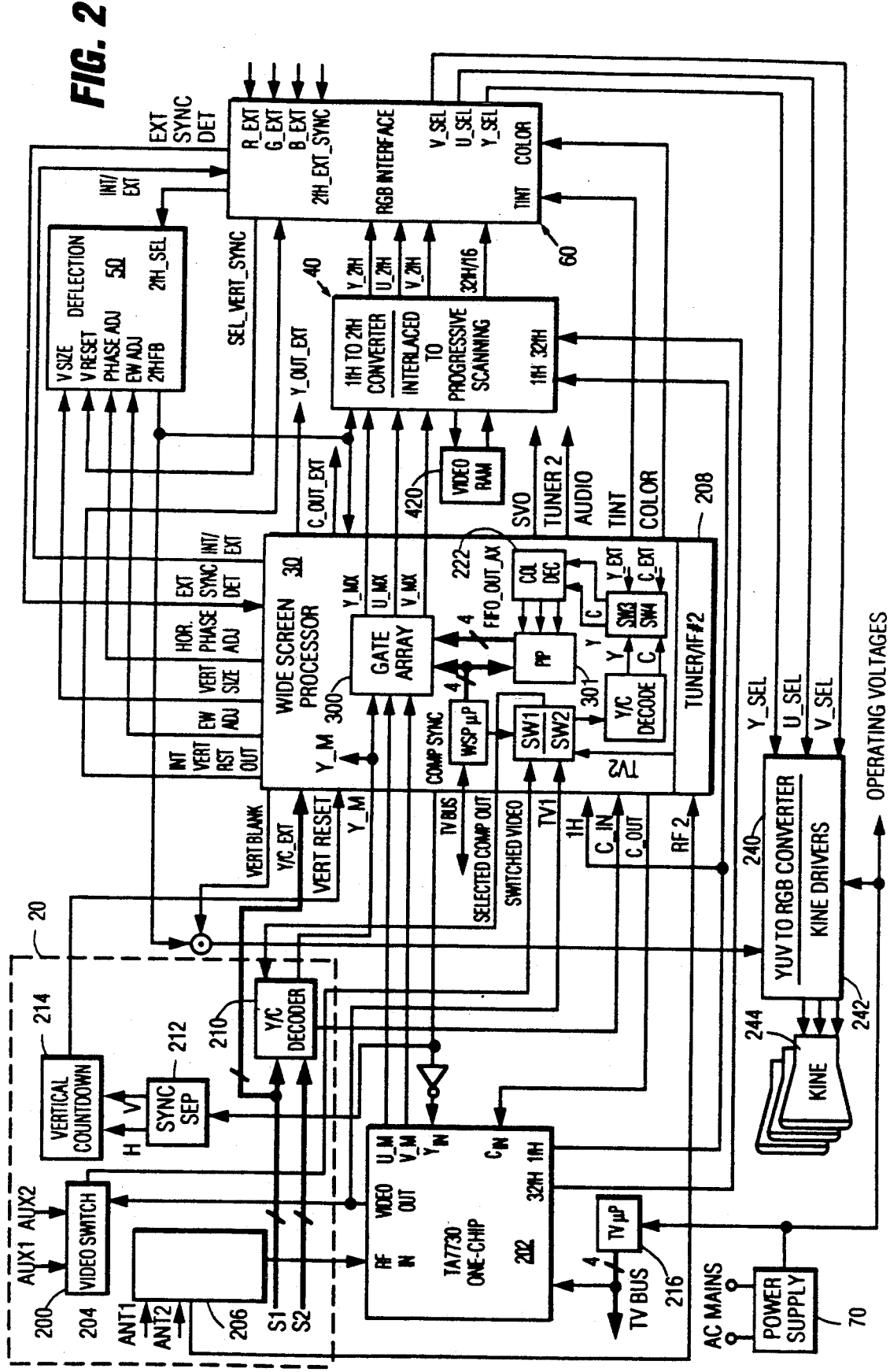
FIG. 2 is a block diagram of a wide screen television in accordance with aspects of this invention and adapted for operation at $2f_H$ horizontal scanning.

An overall block diagram for a wide screen television in accordance with inventive arrangements, and adapted to operate with $2f_H$ horizontal scanning, is shown in FIG. 2 and generally designated 10. The television 10 generally comprises a video signals input section 20, a chassis or TV microprocessor 216, a wide screen processor 30, a $1f_H$ to $2f_H$ converter 40, a deflection circuit 50, an RGB interface 60, a YUV to RGB converter 240, kine drivers 242, direct view or projection tubes 244 and a power supply 70. The grouping of various circuits into different functional blocks is made for purposes of convenience in description, and is not intended as limiting the physical position of such circuits relative to one another.

The video signals input section 20 is adapted for receiving a plurality of composite video signals from different video sources. The video signals may be selectively switched for display as main and auxiliary video signals. An RF switch 204 has two antenna inputs ANT1 and ANT 2. These represent inputs for both off-air antenna reception and cable reception. The RF switch 204 controls which antenna input is supplied to a first tuner 206 and to a second tuner 208. The output of first tuner 206 is an input to a one-chip 202, which performs a number of functions related to tuning, horizontal and vertical deflection and video controls. The particular one-chip shown is industry designated type TA7730. The baseband video signal VIDEO OUT developed in the one-chip and resulting from the signal from first tuner 206 is an input to both video switch 200 and the TV1 input of wide screen processor 30. Other baseband video inputs to video switch 200 are designated AUX1 and AUX 2. These might be used for video cameras, laser disc players, video tape players, video games and the like. The output of the video switch 200, which is controlled by the chassis or TV microprocessor 216 is designated SWITCHED VIDEO. The SWITCHED VIDEO is another input to wide screen processor 30.

Figure 3:
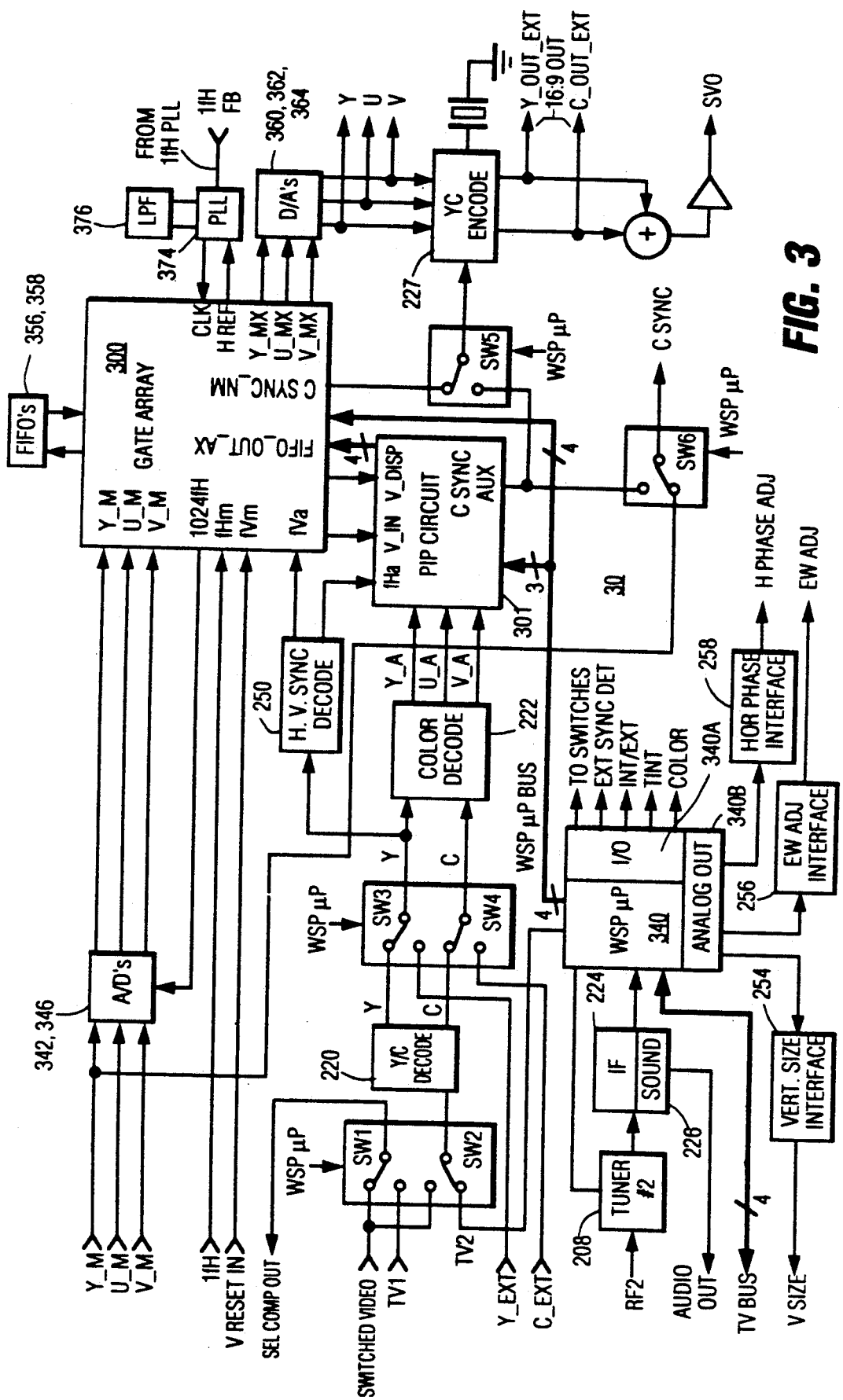
FIG. 3 is a block diagram of the wide screen processor shown in FIG. 2.

With further reference to FIG. 3, a switch SW1 wide screen processor selects between the TV1 and SWITCHED VIDEO signals as a SEL COMP OUT video signal which is an input to a Y/C decoder 210. The Y/C decoder 210 may be implemented as an adaptive line comb filter. Two further video sources S1 and S2 are also inputs to the Y/C decoder 210. Each of S1 and S2 represent different S-VHS sources, and each consists of separate luminance and chrominance signals. A switch, which may be incorporated as part of the Y/C decoder, as in some adaptive line comb filters, or which may be implemented as a separate switch, is responsive to the TV microprocessor 216 for selecting one pair of luminance and chrominance signals as outputs designated Y_M and C_IN respectively. The selected pair of luminance and chrominance signals is thereafter considered the main signal and is processed along a main signal path. Signal designations including _M or _MN refer to the main signal path. The chrominance signal C_IN is redirected by the wide screen processor back to the one-chip, for developing color difference signals U_M and V_M. In this regard, U is an equivalent designation for (R−Y) and V is an equivalent designation for (B−Y). The Y_M, U_M, and V_M signals are converted to digital form in the wide screen processor for further signal processing.

The second tuner 208, functionally defined as part of the wide screen processor 30, develops a baseband video signal TV2. A switch SW2 selects between the TV2 and SWITCHED VIDEO signals as an input to a Y/C decoder 220. The Y/C decoder 220 may be implemented as an adaptive line comb filter. Switches SW3 and SW4 select between the luminance and chrominance outputs of Y/C decoder 220 and the luminance and chrominance signals of an external video source, designated Y_EXT and C_EXT respectively. The Y_EXT and C_EXT signals correspond to the S−VHS input S1. The Y/C decoder 220 and switches SW3 and SW4 may be combined, as in some adaptive line comb filters. The output of switches SW3 and SW4 is thereafter considered the auxiliary signal and is processed along an auxiliary signal path. The selected luminance output is designated Y_A. Signal designations including _A, _AX and _AUX refer to the auxiliary signal path. The selected chrominance is converted to color difference signals U_A and V_A. The Y_A, U_A and V_A signals are converted to digital form for further signal processing. The arrangement of video signal source switching in the main and auxiliary signal paths maximizes flexibility in managing the source selection for the different parts of the different picture display formats.

A composite synchronizing signal COMP SYNC, corresponding to Y_M is provided by the wide screen processor to a sync separator 212. The horizontal and vertical synchronizing components H and V respectively are inputs to a vertical countdown circuit 214. The vertical countdown circuit develops a VERTICAL RESET signal which is directed into the wide screen processor 30. The wide screen processor generates an internal vertical reset output signal INT VERT RST OUT directed to the RGB interface 60. A switch in the RGB interface 60 selects between the internal vertical reset output signal and the vertical synchronizing component of the external RGB source. The output of this switch is a selected vertical synchronizing component SEL_VERT_SYNC directed to the deflection circuit 50. Horizontal and vertical synchronizing signals of the auxiliary video signal are developed by sync separator 250 in the wide screen processor.

The $1f_H$ to $2f_H$ converter 40 is responsible for converting interlaced video signals to progressively scanned noninterlaced signals, for example one wherein each horizontal line is displayed twice, or an additional set of horizontal lines is generated by interpolating adjacent horizontal lines of the same field. In some instances, the use of a previous line or the use of an interpolated line will depend upon the level of movement which is detected between adjacent fields or frames. The converter circuit 40 operates in conjunction with a video RAM 420. The video RAM may be used to store one or more fields of a frame, to enable the progressive display. The converted video data as $Y\_2f_H$, $U\_2f_H$ and $V\_2f_H$ signals is supplied to the RGB interface 60.

The RGB interface 60 enables selection of the converted video data or external RGB video data for display by the video signals input section. The external RGB signal is deemed to be a wide format display ratio signal adapted for $2f_H$ scanning. The vertical synchronizing component of the main signal is supplied to the RGB interface by the wide screen processor as INT VERT RST OUT, enabling a selected vertical sync ($f_{Vm}$ or $f_{Vext}$) to be available to the deflection circuit 50. Operation of the wide screen television enables user selection of an external RGB signal, by generating an internal/external control signal INT/EXT. However, the selection of an external RGB signal input, in the absence of such a signal, can result in vertical collapse of the raster, and damage to the cathode ray tube or projection tubes. Accordingly, the RGB interface circuit detects an external synchronizing signal, in order to override the selection of a non-existent external RGB input. The WSP microprocessor 340 also supplies color and tint controls for the external RGB signal.

The wide screen processor 30 comprises a picture in picture circuit 301 for special signal processing of the auxiliary video signal. The term picture-in-picture is sometimes abbreviated as PIP or pix-in-pix. A gate array 300 combines the main and auxiliary video signal data in a wide variety of display formats, as shown by the examples of FIGS. 1(b) through 1(f). The picture-in-picture circuit 301 and gate array 300 are under the control of a wide screen microprocessor (WSP μP) 340. Microprocessor 340 is responsive to the TV microprocessor 216 over a serial bus. The serial bus includes four signal lines, for data, clock signals, enable signals and reset signals. The wide screen processor 30 also generates a composite vertical blanking/reset signal, as a three level sandcastle signal. Alternatively, the vertical blanking and reset signals can be generated as separate signals. A composite blanking signal is supplied by the video signal input section to the RGB interface.

Figure 6:
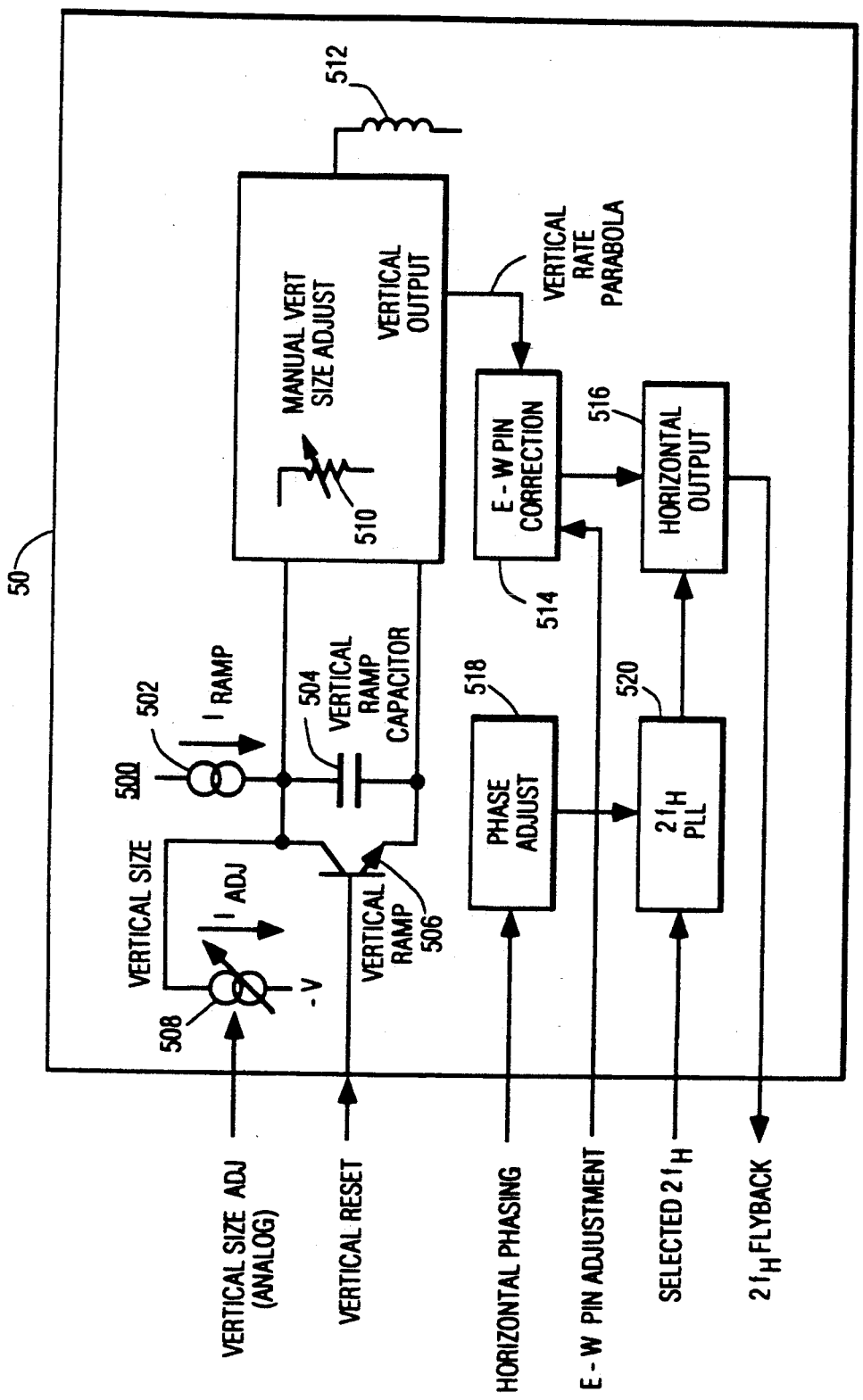
FIG. 6 is a combination block and circuit diagram for the deflection circuit shown in FIG. 2.

The deflection circuit 50, shown in more detail in FIG. 6, receives a vertical reset signal from the wide screen processor, a selected $2f_H$ horizontal synchronizing signal from the RGB interface 60 and additional control signals from the wide screen processor. These additional control signals relate to horizontal phasing, vertical size adjustment and east-west pin adjustment. The deflection circuit 50 supplies $2f_H$ flyback pulses to the wide screen processor 30, the $1f_H$ to $2f_H$ converter 40 and the YUV to RGB converter 240.

Operating voltages for the entire wide screen television are generated by a power supply 70 which can be energized by an AC mains supply.

Figure 4:
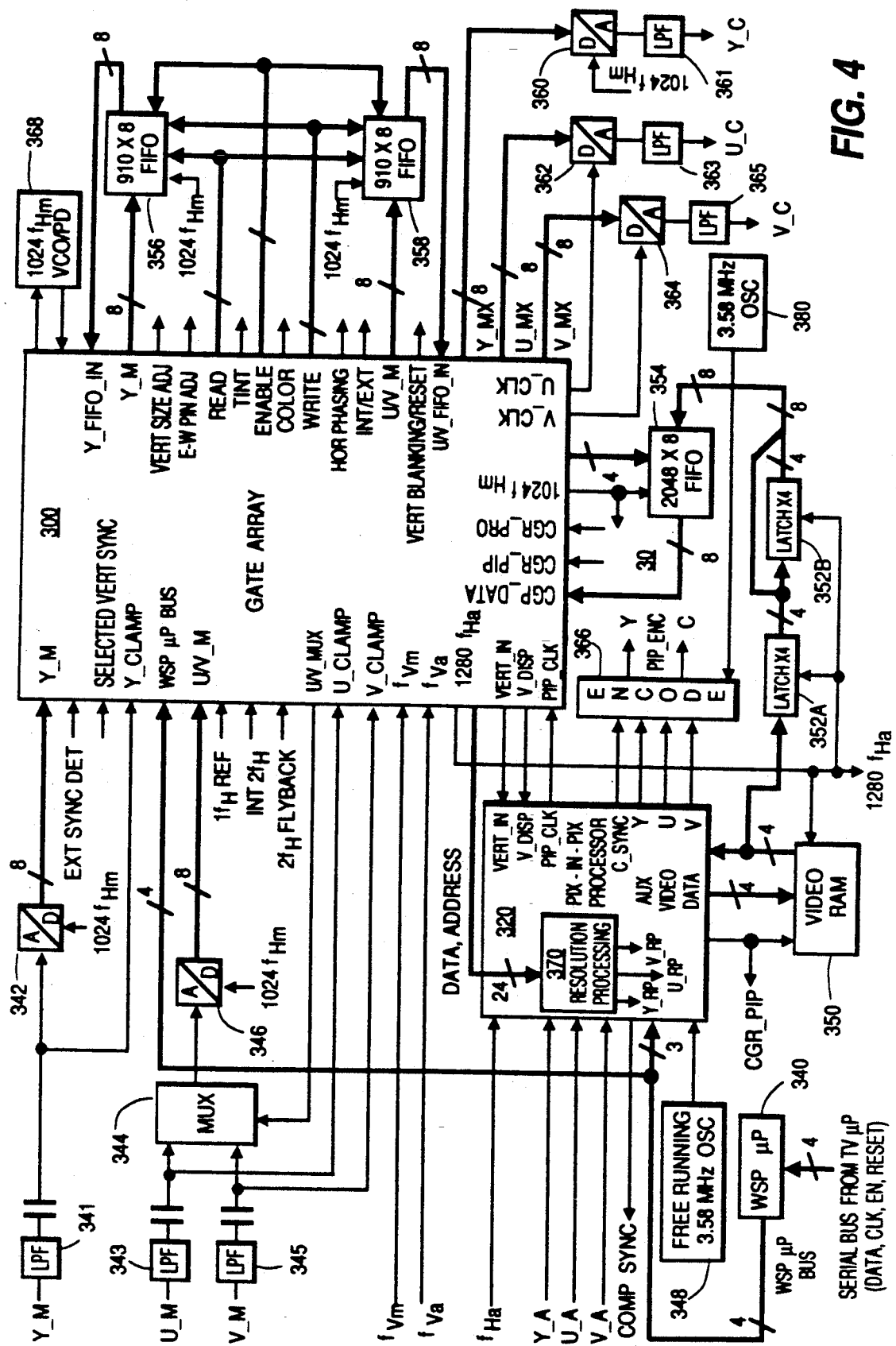
FIG. 4 is a block diagram showing further details of the wide screen processor shown in FIG. 3.

The wide screen processor 30 is shown in more detail in FIG. 3. A number of the elements shown in FIG. 3 have already been described in detail. The principal components of the wide screen processor are a gate array 300, a picture-in-picture circuit 301, analog to digital and digital to analog converters, the second tuner 208, a wide screen processor microprocessor 340 and a wide screen output encoder 227. Further details of the wide screen processor are shown in FIG. 4. The gate array 300 is shown in more detail in FIG. 5.

The second tuner 208 has associated therewith an IF stage 224 and an audio stage 226. The second tuner 208 also operates in conjunction with the WSP μP 340. The WSP μP 340 comprises an input output I/O section 340A and an analog output section 340B. The I/O section 340A provides tint and color control signals, the INT/EXT signal for selecting the external RGB video source and control signals for the switches SW1 through SW6. The I/O section also monitors the EXT SYNC DET signal from the RGB interface to protect the deflection circuit and cathode ray tube(s). The analog output section 340B provides control signals for vertical size, east-west west adjust and horizontal phase, through respective interface circuits 254, 256 and 258.

The gate array 300 is responsible for combining video information from the main and auxiliary signal paths to implement a composite wide screen display, for example one of those shown in the different parts of FIG. 1. Clock information for the gate array is provided by phase locked loop 374, which operates in conjunction with low pass filter 376. The main video signal is supplied to the wide screen processor in analog form, and Y U V format, as signals designated Y_M, U_M and V_M. These main signals are converted from analog to digital form by analog to digital converters 342 and 346, shown in more detail in FIG. 4.

The color component signals are referred to by the generic designations U and V, which may be assigned to either R−Y or B−Y signals, or I and Q signals. The sampled luminance bandwidth is limited to 8 MHz because the system clock rate is $1024f_H$, which is approximately 16 MHz. A single analog to digital converter and an analog switch can be used to sample the color component data because the U and V signals are limited to 500 KHz, or 1.5 MHz for wide I. The select line UV_MUX for the analog switch, or multiplexer 344, is an 8 MHz signal derived by dividing the system clock by 2. A one clock wide start of line SOL pulse synchronously resets this signal to zero at the beginning of each horizontal video line. The UV_MUX line than toggles in state each clock cycle through the horizontal line. Since the line length is an even number of clock cycles, the state of the UV_MUX, once initialized, will consistently toggle 0, 1, 0, 1, ..., without interruption. The Y and UV data streams out of the analog to digital converters 342 and 346 are shifted because the analog to digital converters each have 1 clock cycle of delay. In order to accommodate for this data shift, the clock gating information from the main signal processing path 304 must be similarly delayed. Were the clock gating information not delayed, the UV data will not be correctly paired when deleted. This is important because each UV pair represents one vector. A U element from one vector cannot be paired with a V element from another vector without causing a color shift. Instead, a V sample from a previous pair will be deleted along with the current U sample. This method of UV multiplexing is referred to as 2:1:1, as there are two luminance samples for every pair of color component (U, V) samples. The Nyquist frequency for both U and V is effectively reduced to one half of the luminance Nyquist frequency. Accordingly, the Nyquist frequency of the output of the analog to digital converter for the luminance component is 8 MHz, whereas the Nyquist frequency of the output of the analog to digital converter for the color components is 4 MHz.

The PIP circuit and/or the gate array may also include means for enhancing the resolution of the auxiliary data notwithstanding the data compression. A number of data reduction and data restoration schemes have been developed, including for example dithering and dedithering. Moreover, different dithering sequences involving different numbers of bits and different paired pixel compressions involving different numbers of bits are contemplated. One of a number of particular data reduction and restoration schemes can be selected by the WSP μP 340 in order to maximize resolution of the displayed video for each particular kind of picture display format.

The gate array includes interpolators which operate in conjunction with line memories, which may be implemented as FIFO's 356 and 358. The interpolator and FIFO's are utilized to resample the main signal as desired. An additional interpolator can resample the auxiliary signal. Clock and synchronizing circuits in the gate array control the data manipulation of both the main and auxiliary signals, including the combination thereof into a single output video signal having Y_MX, U_MX and V_MX components. These output components are converted to analog form by digital to analog converters 360, 362 and 364. The analog form signals, designated Y, U and V, are supplied to the $1f_H$ to $2f_H$ converter 40 for conversion to noninterlaced scanning. The Y, U and V signals are also encoded to Y/C format by encoder 227 to define a wide format ratio output signal Y_OUT_EXT/C_OUT_EXT available at panel jacks. Switch SW5 selects a synchronizing signal for the encoder 227 from either the gate array, C_SYNC_MN, or from the PIP circuit, C_SYNC_AUX. Switch SW6 selects between Y_M and C_SYNC_AUX as synchronizing signal for the wide screen panel output.

The deflection circuit 50 is shown in more detail in FIG. 6. A circuit 500 is provided for adjusting the vertical size of the raster, in accordance with a desired amount of vertical overscan necessary for implementing different display formats. As illustrated diagrammatically, a constant current source 502 provides a constant quantity of current $I_{RAMP}$ which charges a vertical ramp capacitor 504. A transistor 506 is coupled in parallel with the vertical ramp capacitor, and periodically discharges the capacitor responsive to the vertical reset signal. In the absence of any adjustment, current $I_{RAMP}$ provides the maximum available vertical size for the raster. This might correspond to the extent of vertical overscan needed to fill the wide screen display by an expanded 4×3 format display ratio signal source, as shown in FIG. 1(a). To the extent that less vertical raster size is required, an adjustable current source 508 diverts a variable amount of current $I_{ADJ}$ from $I_{RAMP}$, so that vertical ramp capacitor 504 charges more slowly and to a smaller peak value. Variable current source 508 is responsive to a vertical size adjust signal, for example in analog form, generated by a vertical size control circuit. Vertical size adjustment 500 is independent of a manual vertical size adjustment 510, which may be implemented by a potentiometer or back panel adjustment knob. In either event, the vertical deflection coil(s) 512 receive(s) driving current of the proper magnitude. Horizontal deflection is provided by phase adjusting circuit 518, East-West pin correction circuit 514, a $2f_H$ phase locked loop 520 and horizontal output circuit 516.

FIG. 4 is a block diagram showing further details of the wide screen processor 30 shown in FIG. 3. The Y_A, U_A and V_A signals are an input to the picture in picture processor 320, which can include a resolution processing circuit 370. The wide screen television according to aspects of this invention can expand and compress video. The special effects embodied by the various composite display formats illustrated in part in FIG. 1 are generated by the picture-in-picture processor 320, which can receive resolution processed data signals Y_RP, U_RP and V_RP from resolution processing circuit 370. Resolution processing need not be utilized at all times, but during selected display formats.

The picture-in-picture processor 320 may be embodied as an improved variation of a basic CPIP chip developed by Thomson Consumer Electronics, Inc. The basic CPIP chip is described more fully in a publication entitled The CTC 140 Picture in Picture (CPIP) Technical Training Manual, available from Thomson Consumer Electronics, Inc., Indianapolis, Ind. A number of special features or special effects are possible, some of which are shown in FIGS. 1(b)-1(f).

The improved picture-in-picture processor 320 is adapted for asymmetrically compressing the video data in one of a plurality of selectable display modes. In this mode of operation, the pictures are compressed 4:1 in the horizontal direction and 3:1 in the vertical direction. This asymmetric mode of compression produces aspect ratio distorted pictures for storage in the video RAM. Objects in the pictures are squeezed horizontally. However, if these pictures are read out normally, as for example in the channel scan mode, for display of a 16×9 format display ratio screen, the pictures appear correct. The picture fills the screen and there is no aspect ratio distortion. The asymmetric compression mode according to this aspect of the invention makes it possible to generate the special display formats on a 16×9 screen without external speed up circuitry.

In full screen PIP modes, the picture-in-picture processor, in conjunction with a free running oscillator 348 will take Y/C input from a decoder, for example an adaptive line comb filter, decode the signal into Y, U, V color components and generate horizontal and vertical sync pulses. These signals are processed in the picture-in-picture processor for the various full screen modes such as zoom, freeze and channel scan. During the channel scan mode, for example, the horizontal and vertical sync present from the video signals input section will have many discontinuities because the signals sampled (different channels) will have non-related sync pulses and will be switched at seemingly random moments in time. Therefore the sample clock (and read/write video RAM clock) is determined by the free running oscillator. For freeze and zoom modes, the sample clock will be locked to incoming video horizontal sync, which in these special cases is the same as the display clock frequency.

In general, the picture-in-picture processor 320 digitizes the video signal into luminance (Y) and color difference signals (U, V), subsampling and storing the results in a 1 megabit video RAM 350 as explained above. The video RAM 350 associated with the picture-in-picture processor 320 has a memory capacity of 1 megabit, which is not large enough to store a full field of video data with 8-bit samples. Increased memory capacity tends to be expensive and can require more complex management circuitry. The smaller number of bits per sample in the auxiliary channel represents a reduction in quantization resolution, or bandwidth, relative to the main signal, which is processed with 8-bit samples throughout. This effective reduction of bandwidth is not usually a problem when the auxiliary displayed picture is relatively small, but can be troublesome if the auxiliary displayed picture is larger, for example the same size as the main displayed picture. Resolution processing circuit 370 can selectively implement one or more schemes for enhancing the quantization resolution or effective bandwidth of the auxiliary video data. A number of data reduction and data restoration schemes have been developed, including for example, dithering and dedithering. A dedithering circuit would be operatively disposed downstream of the video RAM 350, for example in the auxiliary signal path of the gate array, as explained in more detail below. Moreover, different dithering and dedithering sequences involving different numbers of bits can be implemented. One of a number of particular data reduction and restoration schemes can be selected by the WSP $\mu$P in order to maximize resolution of the displayed video for each particular kind of picture display format.

The luminance and color difference signals of the auxiliary signal are stored in an 8:1:1 six-bit Y, U, V fashion in a video RAM 350 forming part of the picture-in-picture processor. In other words, each component is quantized into six-bit samples. There are eight luminance samples for every pair of color difference samples. Briefly, the picture-in-picture processor 320 is operated in a mode whereby incoming video data is sampled with a 640$f_H$ clock rate locked to the incoming auxiliary video synchronizing signal instead. In this mode, data stored in the video RAM 350 is orthogonally sampled. When the data is read out of the picture-in-picture processor video RAM 350, it is read using the same 640$f_H$ clock locked to the incoming auxiliary video signal. However, even though this data was orthogonally sampled and stored, and can be read out orthogonally, it cannot be displayed orthogonally directly from the video RAM 350, due to the asynchronous nature of the main and auxiliary video sources. The main and auxiliary video sources might be expected to be synchronous only in that instance where they are displaying signals from the same video source.

The Y, U, V and C—SYNC (composite sync) outputs from the picture-in-picture processor in analog form can be re-encoded into Y/C components by encode circuit 366, which operates in conjunction with a 3.58 MHz oscillator 380. This Y/C—PIP—ENC signal may be connected to a Y/C switch, not shown, which enables the re-encoded Y/C components to be substituted for the Y/C components of the main signal. From this point on, the PIP encoded Y, U, V and sync signals can be the basis for horizontal and vertical timing in the rest of the chassis. This mode of operation is appropriate for implementing a zoom mode for the PIP, based upon operation of the interpolator and FIFO's in the main signal path.

Figure 5:
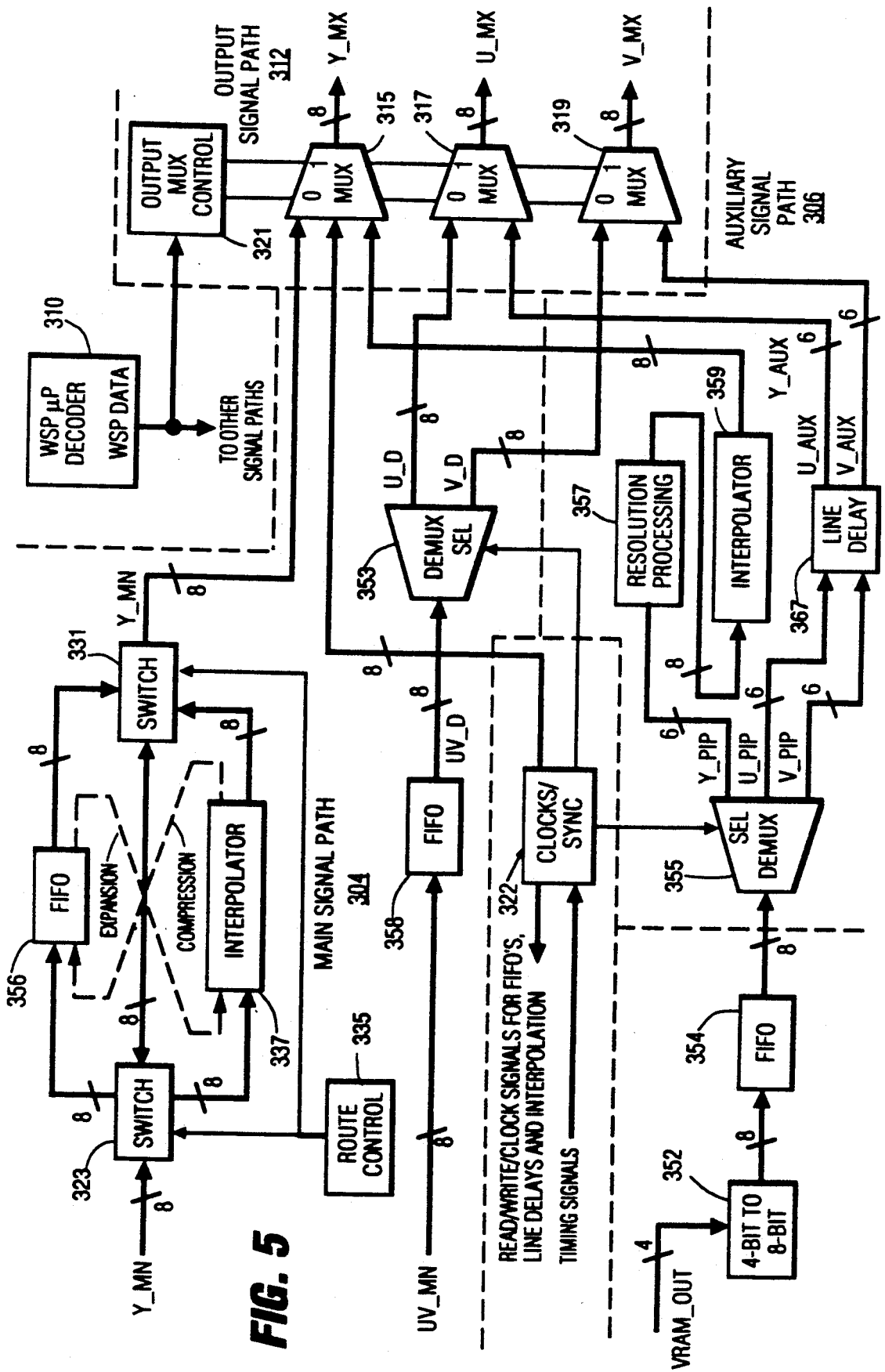
FIG. 5 is a block diagram of the gate array shown in FIG. 4 and illustrating the main, auxiliary and output signal paths.

The main signal path 304, auxiliary signal path 306 and output signal path 312 of the gate array 300 are shown in block diagram form in FIG. 5. The gate array also comprises a clocks/sync circuit 322 and a WSP $\mu$P decoder 310. Data and address output lines of the WSP $\mu$P decoder 310, identified as WSP DATA, are supplied to each of the main circuits and paths identified above, as well as to the picture-in-picture processor 320 and resolution processing circuit 370. It will be appreciated that whether or not certain circuits are, or are not, defined as being part of the gate array is largely a matter of convenience for facilitating the explanation.

The gate array is responsible for expanding, compressing and cropping video data of the main video channel, as and if necessary, to implement different picture display formats. The luminance component Y—MN is stored in a first in first out (FIFO) line memory 356 for a length of time depending on the nature of the interpolation of the luminance component. The combined chrominance components U/V—MN are stored in FIFO 358. Auxiliary signal luminance and chrominance components Y—PIP, U—PIP and V—PIP are developed by demultiplexer 355. The luminance component undergoes resolution processing, as desired, in circuit 357, and is expanded as necessary by interpolator 359, generating signal Y—AUX as an output.

In some instances, the auxiliary display will be as large as the main signal display, as shown for example in FIG. 1(d). The memory limitations associated with the picture-in-picture processor and video RAM 350 can provide an insufficient number of data points, or pixels for filling such a large display area. In those circumstances, resolution processing circuit 357 can be used to restore pixels to the auxiliary video signal to replace those lost during data compression, or reduction. The resolution processing may correspond to the resolution processing undertaken by circuit 370 shown in FIG. 4.

As an example, circuit 370 may be a dithering circuit and circuit 357 may be a dedithering circuit.

With reference to FIGS. 4 and 5, the auxiliary video input data is sampled at a 640 $f_H$ rate and stored in video RAM 350. The auxiliary data is read out of video RAM 350 is designated VRAM—OUT. The picture-in-picture processor 320 also has the capability of reducing the auxiliary picture by equal integer factors horizontally and vertically, as well as asymmetrically. The auxiliary channel data is buffered and synchronized to the main channel digital video by the 4 bit to 8 bit circuit 352, comprising 4 bit latches 352A and 352B, the auxiliary FIFO 354, timing circuit 369 and synchronization circuit 368. The VRAM—OUT data is sorted into Y (luminance), U, V (color components), and FSW—DAT (fast switch data) by demultiplexer 355. The FSW—DAT indicates which field type was written into the video RAM. The PIP—FSW signal is received directly from the PIP circuit and applied to the output MUX control circuit 321 to determine which field read out of video RAM is to be displayed during the small picture modes.

The auxiliary channel is sampled at 640 $f_H$ rate while the main channel is sampled at a 1024 $f_H$ rate. The auxiliary channel FIFO 354 converts the data from the auxiliary channel sample rate to the main channel clock rate. In this process, the video signal undergoes an 8/5 (1024/640) compression. This is more than the 4/3 compression necessary to correctly display the auxiliary channel signal. Therefore, the auxiliary channel must be expanded by the interpolator 359 to correctly display a 4×3 small picture. The interpolator 359 is controlled directly or indirectly by WSP $\mu$P 340. The amount of interpolator expansion required is 5/6. The expansion factor X is determined as follows:

$$X=(640/1024)*(4/3)=5/6$$

The chrominance components U—PIP and V—PIP are delayed by circuit 367 for a length of time depending on the nature of the interpolation of the luminance component, generating signals U—AUX and V—AUX as outputs. The respective Y, U and V components of the main and auxiliary signals are combined in respective multiplexers 315, 317 and 319 in the output signal path 312, by controlling the read enable signals of the FIFO's 354, 356 and 358. The multiplexers 315, 317 and 319 are responsive to output multiplexer control circuit 321. Output multiplexer control circuit 321 is responsive to a clock signal, a start of line signal, a horizontal line counter signal, the vertical blanking reset signal and the output of the fast switch from the picture-in-picture processor and WSP $\mu$P 340. The multiplexed luminance and chrominance components Y—MX, U—MX and V—MX are supplied to respective digital/analog converters 360, 362 and 364 respectively. The digital to analog converters are followed by low pass filters 361, 363 and 365 respectively. The various functions of the picture-in-picture processor, the gate array and the data reduction circuit are controlled by WSP $\mu$P 340. The WSP $\mu$P 340 is responsive to the TV $\mu$P 216, being connected thereto by a serial bus. The serial bus may be a four wire bus as shown, having lines for data, clock signals, enable signals and reset signals. The WSP $\mu$P 340 communicates with the different circuits of the gate array through a WSP $\mu$P decoder 310.

In one case, it is necessary to compress the 4×3 NTSC video by a factor of 4/3 to avoid aspect ratio distortion of the displayed picture. In the other case, the video can be expanded to perform horizontal zooming operations usually accompanied by vertical zooming. Horizontal zoom operations up to 33% can be accomplished by reducing compressions to less than 4/3. A sample interpolator is used to recalculate the incoming video to a new pixel positions because the luminance video bandwidth, up to 5.5 MHz for S-VHS format, occupies a large percentage of the Nyquist fold over frequency, which is 8 MHz for a 1024 $f_H$ clock.

As shown in FIG. 5, the luminance data Y_MN is routed through an interpolator 337 in the main signal path 304 which recalculates sample values based on the compression or the expansion of the video. The function of the switches or route selectors 323 and 331 is to reverse the topology of the main signal path 304 with respect to the relative positions of the FIFO 356 and the interpolator 337. In particular, these switches select whether the interpolator 337 precedes the FIFO 356, as required for picture compression, or whether the FIFO 356 precedes the interpolator 337, as required for picture expansion. The switches 323 and 331 are responsive to a route control circuit 335, which is itself responsive to the WSP $\mu$P 340. It will be remembered that the auxiliary video signal is compressed for storage in the video RAM 350, and only expansion is necessary for practical purposes. Accordingly, no comparable switching is required in the auxiliary signal path.

In order to implement video compressions through the use of a FIFO, for example, every fourth sample can be inhibited from being written into the FIFO 356. This constitutes a 4/3 compression. It is the function of the interpolator 337 to recalculate the luminance samples being written into the FIFO so that the data read out of the FIFO is smooth, rather than jagged. Expansions may be performed in exactly the opposite manner as compressions. In the case of compressions the write enable signal has clock gating information attached to it in the form of inhibit pulses. For expanding data, the clock gating information is applied to the read enable signal. This will pause the data as it is being read from the FIFO 356. In this case it is the function of the interpolator 337, which follows the FIFO 356 during this process, to recalculate the sampled data from jagged to smooth. In the expansion case the data must pause while being read from the FIFO 356 and while being clocked into the interpolator 337. This is different from the compression case where the data is continuously clocked through the interpolator 337. For both cases, compression and expansion, the clock gating operations can easily be performed in a synchronous manner, that is, events can occur based on the rising edges of the system clock 1024 $f_H$.

Interpolation of the auxiliary signal takes place in the auxiliary signal path 306. The picture-in-picture processor 320 manipulates a 6 bit Y, U, V, 8:1:1 field memory, video RAM 350, to store incoming video data. The video RAM 350 holds two fields of video data in a plurality of memory locations. Each memory location holds eight bits of data. In each 8-bit location there is one 6-bit Y (luminance) sample (sampled at 640 $f_H$) and 2 other bits. These two other bits hold either fast switch data (FSW_DAT) or part of a U or V sample (sampled at 80 $f_H$). The FSW_DAT values indicate which type of field was written into video RAM. Since there are two fields of data stored in the video RAM 350, and the entire video RAM 350 is read during the display period, both fields are read during the display scan. The picture-in-picture processor 320 will determine which field will be read out of the memory to be displayed through the use of the fast switch data. The PIP circuit always reads the opposite field type that is being written to overcome a motion tear problem. If the field type being read is the opposite type than that being displayed, then the even field stored in the video RAM can be inverted by deleting the top line of the field when the field is read out of memory. The result is that the small picture maintains correct interlace without a motion tear.

The clocks/sync circuit 322 generates read, write and enable signals needed for operating FIFOs 354, 356 and 358. The FIFOs for the main and auxiliary channels are enabled for writing data into storage for those portions of each video line which is required for subsequent display. Data is written from one of the main or auxiliary channels, but not both, as necessary to combine data from each source on the same video line or lines of the display. The FIFO 354 of the auxiliary channel is written synchronously with the auxiliary video signal, but is read out of memory synchronously with the main video signal. The main video signal components are read into the FIFOs 356 and 358 synchronously with the main video signal, and are read out of memory synchronously with the main video. How often the read function is switched back and forth between the main and auxiliary channels is a function of the particular special effect chosen.

Generation of different special effects such as cropped side-by-side pictures are accomplished through manipulating the read and write enable control signals for the line memory FIFOs. This display format, shown in FIG. 1(d), is particularly desirable as it enables two nearly full field pictures to displayed in a side by side format. The display is particularly effective and appropriate for a wide format display ratio display, for example 16×9. Most NTSC signals are represented in a 4×3 format, which of course corresponds to 12×9. Two 4×3 format display ratio NTSC pictures may be presented on the same 16×9 format display ratio display, either by cropping the pictures by 33% or squeezing the pictures by 33%, and introducing aspect ratio distortion. Depending on user preference, the ratio of picture cropping to aspect ratio distortion may be set any where in between the limits of 0% and 33%. As an example, two side by side pictures may be presented as 16.7% squeezed and 16.7% cropped.

The horizontal display time for a 16×9 format display ratio display is the same as a 4×3 format display ratio display, because both have 62.5 microsecond nominal line length. Accordingly, an NTSC video signal must be sped up by a factor of 4/3 to preserve a correct aspect ratio, without distortion. The 4/3 factor is calculated as ratio of the two display formats:

4/3=(16/9)/(4/3)

Variable interpolators are utilized in accordance with aspects of this invention to speed up the video signals. In the past, FIFOs having different clock rates at the inputs and outputs have been used to perform a similar function. By way of comparison, if two NTSC 4×3 format display ratio signals are displayed on a single 4×3 format display ratio display, each picture must be distorted or cropped, or some combination thereof, by 50%. A speed up comparable to that needed for a wide screen application is unnecessary.

Generally, the video display and deflection system is synchronized with the main video signal. The main video signal must be speeded up, as explained above, to fill the wide screen display. The auxiliary video signal must be vertically synchronized with the first video signal and the video display. The auxiliary video signal can be delayed by a fraction of a field period in a field memory, and then expanded in a line memory. Synchronization of the auxiliary video data with main video data is accomplished by utilizing the video RAM 350 as a field memory and a first in first out (FIFO) line memory device 354 for expanding the signal.

The asynchronous nature of the read and write clocks, however, does require that steps by undertaken to avoid read/write pointer collisions. Read/write pointer collisions occur when old data is read out of the FIFO before new data has an opportunity to be written into the FIFO. The size of the FIFO is related to the minimum line storage capacity thought to be reasonably necessary to avoid read/write pointer collisions.

Another problem stemming from the asynchronous reading and writing of the FIFO is that of maintaining interlace integrity of the auxiliary channel video. Since the display is locked to the main channel video, the current field type being displayed, that is the upper or lower field, will be determined by the main signal. The field type which is stored in the video RAM 350 memory and ready to be read out at the start of the main channel field may or may not be the same as the displayed field type. It may be necessary to change the auxiliary field type stored in the video RAM 350 to match that of the main channel display.

Figure 7:
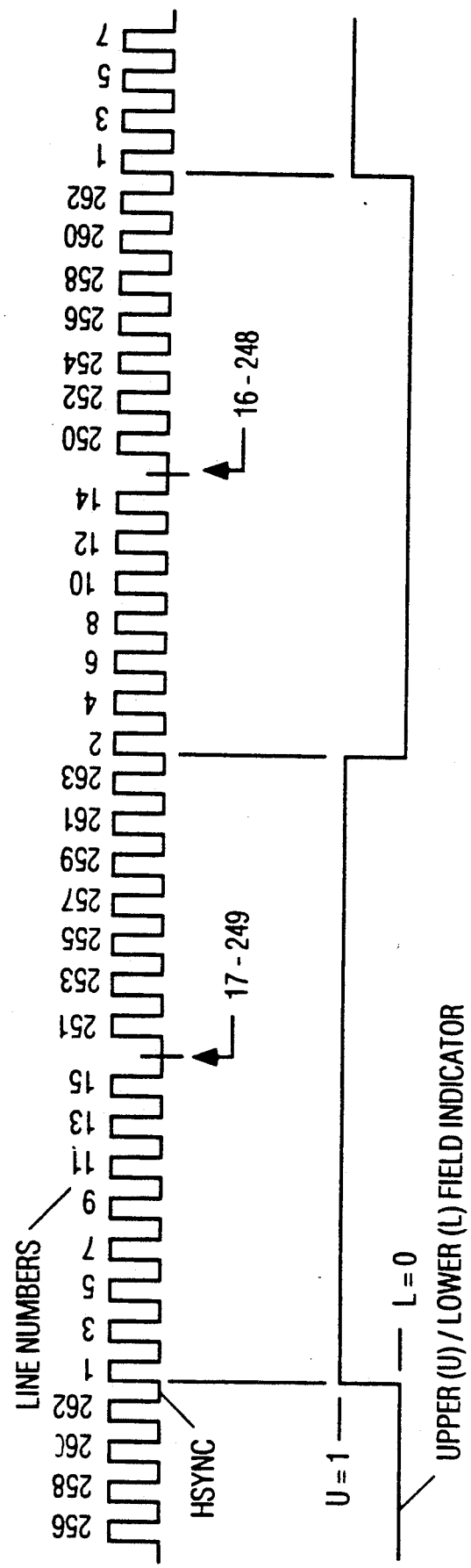
FIG. 7 is a timing diagram illustrating the correspondence of an upper/lower field indicator to the horizontal lines of a video frame.
Figure 8:
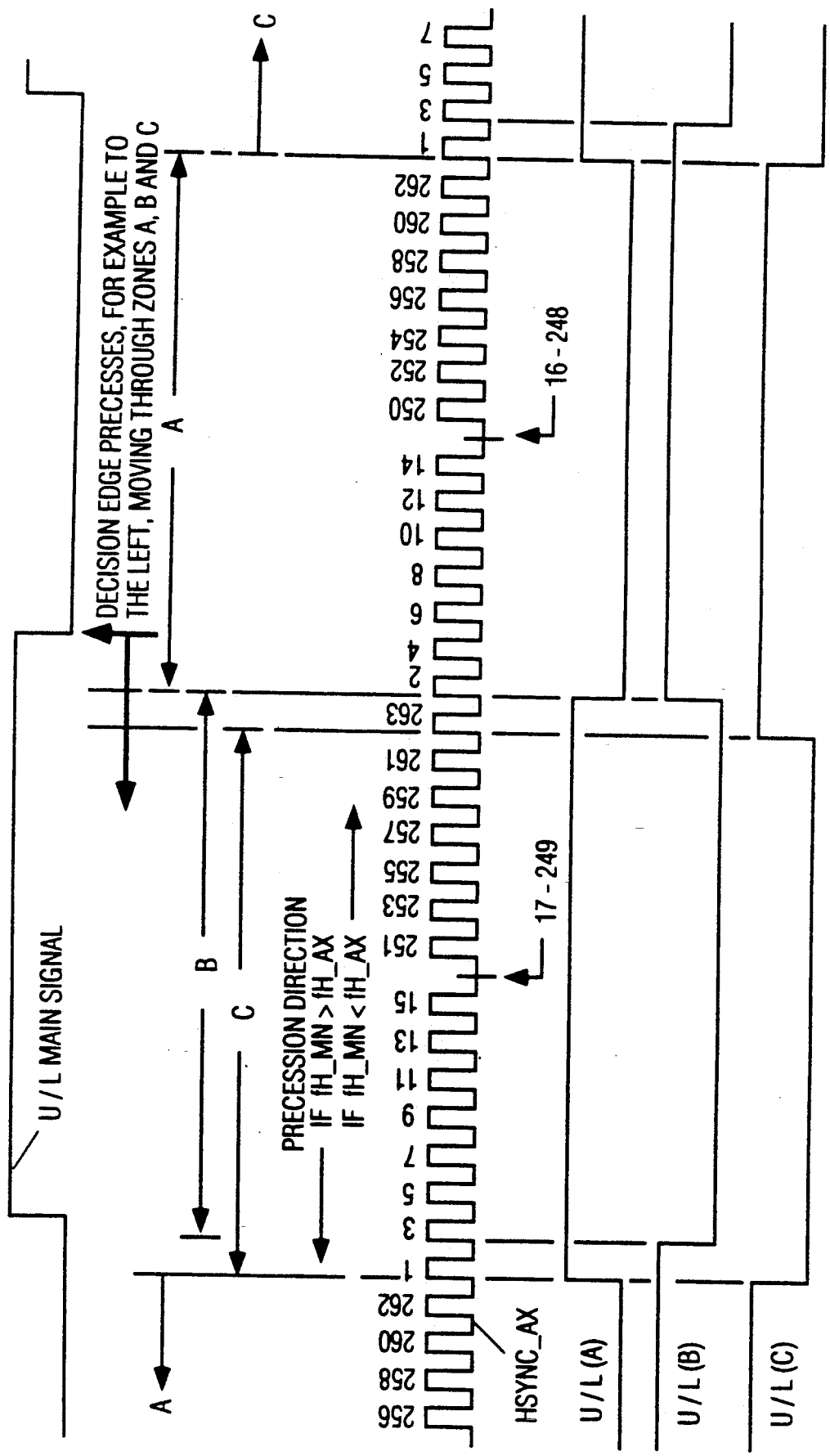

The picture-in-picture processor 320 and the gate array 300 quantize 262.5 line fields of the NTSC signal into 263 line upper fields (sometimes referred to odd fields) and 262 line lower fields (sometimes called even fields). This is due to fact that vertical sync is sampled with pulses representing horizontal sync. This is illustrated by the diagram of FIG. 7. An upper/lower (odd-/even) field type indicator has a value 1 for upper fields and a value 0 for lower fields. The upper fields include odd lines 1 through 263. The lower fields include even lines 2 through 262. In FIG. 8, the first field type indicator U/L MAIN SIGNAL represents the field type of the main video channel. The signal HSYNC_AX represents the horizontal sync signals for each line of the auxiliary channel.

The field type indicator U/L(A) represents the field type stored in the video ram 350 if each auxiliary channel line were written in "normally". The term normal is used here to indicate that the odd lines 1-263 are written in to the video RAM 350 as the upper field is being received and decoded. The field type indicator U/L(B) represents the field type stored in the video RAM 350 if the first line of the upper field is not written into the video RAM 350 during the reception of an upper field. Instead, the first line is actually tacked onto the last line (number 262) of the lower field. This effectively inverts the field type since line 2 will be the first displayed line and line 3 will be the second displayed line in the frame. The received upper field now becomes the lower field and vice-versa. The field type indicator U/L(C) represents the field type stored in the video RAM 350 if the last line of the upper field is added to the video RAM 350 during the reception of the lower field. This effectively inverts the field type, since line 263 will be the first displayed line and line 1 will be the second displayed line.

The addition and subtraction of lines in modes B and C does not degrade the auxiliary channel picture because these lines occur during vertical retrace or overscan. The order of the displayed lines is shown in FIG. 10, where solid lines represent upper field lines and dotted lines represent lower field lines.

As the main and auxiliary channel signals precess, the U/L MAIN SIGNAL will shift to the left or the right with respect to the auxiliary channel U/L(A,B,C) field type indicators. In the position shown in the diagram, data should be written into the video RAM 350 using mode A, because the decision edge is in zone A. Mode A is appropriate because when the picture-in-picture processor receives vertical sync, it will write the same field type into the video RAM 350 as will be required by the display to read from the video RAM 350 starting with V_SYNC_MN (main channel vertical sync). As the signals precess, the mode will change according to their relative positions. The valid modes are shown graphically at the top of FIG. 8 and in the table of FIG. 9. There is an overlap between modes B and C, since most of the time that mode B is valid, mode C is also valid, and vice-versa. This is true for all but 2 lines out of 262 lines. Either of modes B or C can be utilized when both are valid.

A block diagram of a circuit 700 for maintaining interlace integrity according to this inventive arrangement is shown in FIG. 12. The output signals of circuit 700 are write and read reset control signals for the video RAM 350, the FIFO 354 in the auxiliary signal path and the FIFO 356 in the main signal path, as shown in FIG. 9. The field type of the main video signal is determined from a pair of signals, VSYNC_MN AND HSYNC_MN. The field type of the auxiliary video signal is determined from a corresponding pair of signals, VSYNC_AX AND HSYNC_AX. Each pair of signals has a predetermined phase relationship which is set in the gate array. This relationship is shown in FIGS. 11(a)-11(c), which apply to both pairs of signals. In each case, HSYNC is a square wave, whose rising edge corresponds to the start of a horizontal line of the respective signal. In each case, VSYNC has only one rising edge per field, which corresponds to the start of a vertical field of the respective signal. The relationship between the rising edges of the respective pairs of signals is tested by circuit 700 to determine what steps, if any, are necessary to match the field type of the auxiliary signal to the field type of the main signal. In order to prevent ambiguity, the leading edges of the main pair of signals are never closer than ⅛ of a horizontal line period. The leading edges of the auxiliary pair of signals are never closer than 1/10 of a horizontal line period. This prevents jitter of the leading edges relative to one another. This relationship is assured by the timing circuits in the gate array.

The main signal pair VSYNC_MN and HSYNC_MN are inputs to a first field type detecting circuit 702, which comprises two D-type flip/flops. In one case, HSYNC_MN is sampled by VSYNC_MN, that is, VSYNC_MN is the clock input. The output of this flip/flop is an upper/lower field indicator UL_MN for the main signal, which can be a logical HI for an upper field type and a logical LO for a lower field type, although this is arbitrary. In the other case, VSYNC_MN is sampled by HSYNC_MN. This provides an output $V_H$, which is the vertical synchronized to the horizontal.

The auxiliary signal pair VSYNC_AX and HSYNC_AX are inputs to a second field type detecting circuit 710, which also comprises two D-type flip/flops. In one case, HSYNC_AX is sampled by VSYNC_AX, that is, VSYNC_AX is the clock input. The output of this flip/flop is an upper/lower field indicator UL_AX for the auxiliary signal, which can be a logical HI for an upper field type and a logical LO for a lower field type, although this is arbitrary. In the other case, VSYNC_AX is sampled by HSYNC_AX. This provides an output $V_H$, which is the vertical synchronized to the horizontal.

The field is a lower, or even, field type if the rising start of field edge occurs in the first half of the horizontal line period, as in FIG. 11(b). The field is an upper, or odd, field type if the rising start of field edge occurs in the second half of the horizontal line period, as in FIG. 11(c).

The $V_H$ for the main signal and HSYNC_MN are inputs to delay circuits 704, 706 and 708, which provide horizontal line period delays to assure the proper phase relationship of the output signals WR_RST_FIFO_MN, RD_RST_FIFO$_{MN}$ and RD_RST_FIFO_AX. The delay operation can be implemented by D-type flip/flops. Two to three horizontal line periods of delay are provided between the write and read pointers.

The upper/lower field type indicator UL_MN corresponds to U/L MAIN SIGNAL shown at the top of FIG. 8 and is one input to a UL_SEL comparator 714. The other inputs to comparator 714 are supplied by UL_AX test generator 712. Test generator 712 has the UL_AX field indicator as an input, as well as HSYNC_AX as a clock input. Test generator 712 provides signals U/L(A), U/L(B) and U/L(C) shown in the bottom of FIG. 8, corresponding to the three possible modes A, B and C. Each of the signals U/L(A), U/L(B) and U/L(C) is compared with UL_MN, at the time of the decision edge of U/L_MN, also shown in FIG. 8. If UL_MN matches U/L(A), the field types match and no action to maintain interlace integrity is necessary. If UL_MN matches U/L(B), the field types do not match. It is necessary to delay writing the upper field by one line to maintain interlace integrity. If UL_MN matches U/L(C), the field types do not match. It is necessary to advance writing the lower field by one line to maintain interlace integrity.

The results of this comparison are an input to RST_AX_SEL selector circuit 718. The other inputs are the three vertical synchronizing signals RST_A, RST_B and RST_C generated by RST_AX_GEN generator 716. The three vertical synchronizing signals RST_A, RST_B and RST_C have different phases relative to one another in order to implement the corrective action, or no corrective action, to maintain interlace integrity according to the output of the comparator 714. Delay circuit 722 resynchronizes the selected vertical synchronizing signal with the auxiliary video input to generate WR_RST_VRAM_AX. Delay circuit 720 performs a similar function for generating RD_RST_VRAM_AX and WR_RST_FIFO_AX. As seen in FIG. 8, modes B and C overlap most of the time. In fact, only two out of every 525 comparisons will require only one of modes B or C, rather than either. The comparator 714 can be arranged to favor mode C over mode B when both modes are valid. This choice can be arbitrary, or based on other circuit considerations.

Another problem can occur when the main video source is a noninterlaced source, as can be the case with certain video games and computers, and the auxiliary video source is an interlaced source, again because the display is locked to the main signal. A noninterlaced display will not display alternate fields in alternate interlaced positions, that is, such that the lines of the respective fields are spatially offset and in between one another. Accordingly, the upper and lower fields of each frame of an interlaced source will be displayed directly on top of one another when shown on a noninterlaced display. The interlaced picture will appear vertically smeared, which is generally considered quite objectionable. The problem is compounded in a side by side display, as compared to a small inset picture-in-picture (also referred to as PIP). In a side by side display, the main picture, from the noninterlaced source, and auxiliary picture, from the interlaced source, are of substantially comparable size, and both large by comparison to a typical PIP. This invention solves this problem with a system for displaying signals from noninterlaced video sources on displays locked to signals from noninterlaced video sources. The system is particularly appropriate for multiple video displays as can be arranged on a wide screen television, for example, side by side display of main and auxiliary pictures wherein the main picture originates from a noninterlaced video source and the auxiliary picture originates from an interlaced video source.

In accordance with an inventive arrangement, the presence of a signal from a noninterlaced video source on the main picture channel is detected. Such detection can be implemented by detecting that successive fields have the same field type. The presence of a signal from a noninterlaced source can be used to change the mode of operation of a video RAM and an associated control circuit. In one mode, the video RAM may be used to store successive fields of an auxiliary video signal. These fields may be read out successively when the main picture channel is an interlaced signal.

When the main signal is noninterlaced, the video RAM and control circuit can operate in another mode, wherein only every other field of the auxiliary signal is read from the video RAM and combined with the main signal, even though all fields may still be written into the video RAM. Alternatively, only every other field can be written into the video RAM, and thereafter read from the video RAM. In either case, only upper fields (odd fields) or only lower fields (even fields) will be read from the video RAM. Each of these fields will be read and displayed twice, in the same vertical position. There will be some loss of vertical resolution, but there will be no vertical smearing. Overall, the picture quality of the auxiliary signal will be significantly improved.

The entire process can be controlled by a central control system, for example a microprocessor. The microprocessor can monitor the noninterlaced signal source detector, and in accordance with detection or nondetection, set the operating mode of the video RAM and associated control circuit for supplying all fields of the auxiliary video signal, or only upper or only lower fields of the auxiliary video signal, to the circuit which combined the signals for the simultaneous display.

Figure 13:
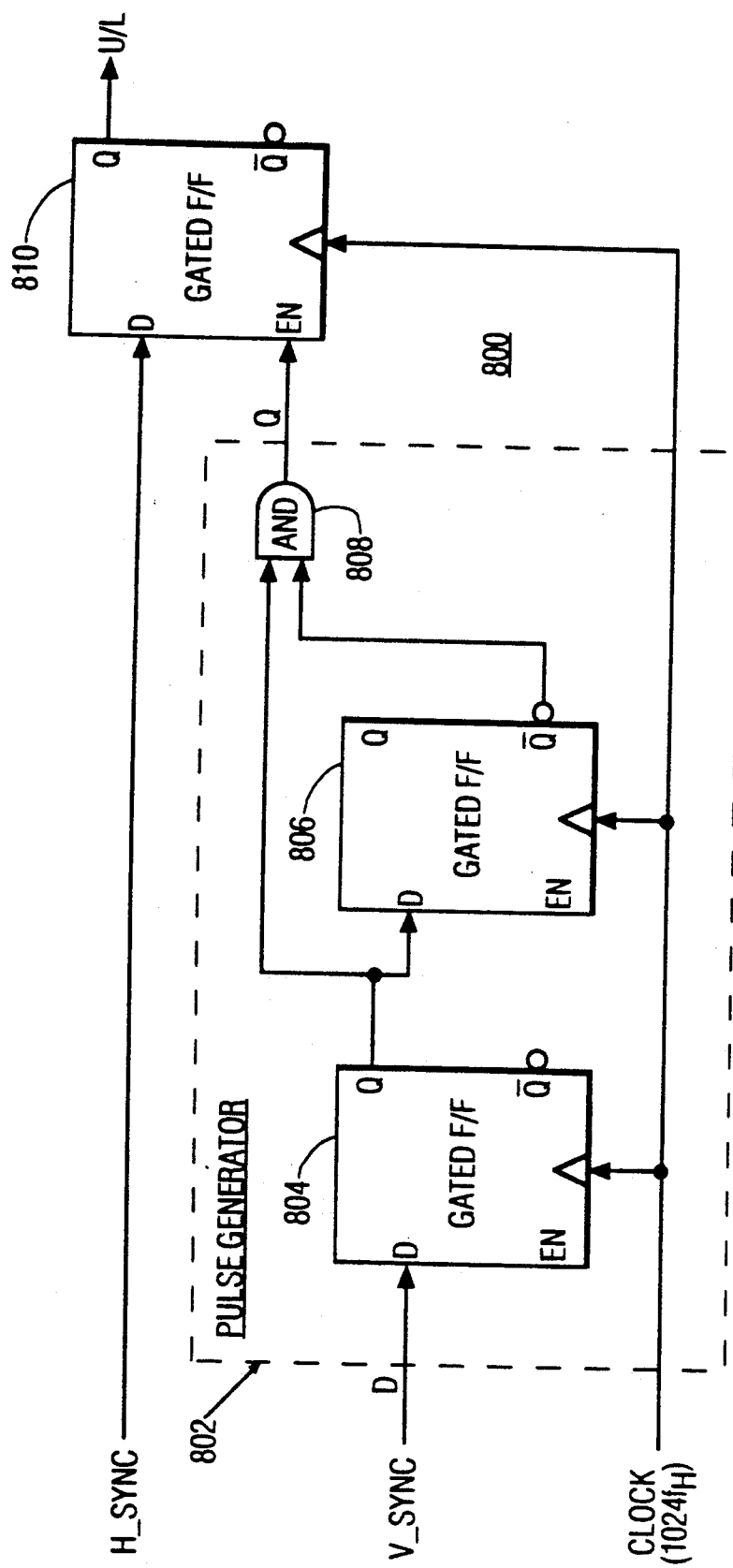

With reference to FIG. 13, V_SYNC is a processed vertical synchronizing pulse whose rising edge corresponds to the beginning of the video signal's vertical synchronization. The H_SYNC signal is a processed horizontal synchronizing pulse whose rising edge corresponds to the leading edge of the video signal's horizontal synchronizing pulse. As shown in FIG. 11(c), an odd type field is detected when V_SYNC occurs just prior to a rising edge of H_SYNC. An even field is detected when V_SYNC occurs more than one-half of a line prior to the rising edge of H_SYNC, as shown in FIG. 11(b).

The field type detector 800 comprises a pulse generator 802 and a D-type flip/flop 810. The pulse generator 802 comprises tow gated flip/flops 804 and 806, and an AND gate 808. The V_SYNC signal is an input to flip/flop 804. The Q output of flip/flop 804 is an input to flip/flop 806 and one input to AND gate 808. The inverted Q output of flip/flop 806 is the other input to AND gate 808. The flip/flops 804, 806 and 810 are clocked by $1024f_H$. The Q output of the pulse generator is a one clock wide pulse occurring at the beginning of vertical synchronization. This one clock wide pulse is the enable (EN) input for flip/flop 810. The pulse samples the H_SYNC signal on the D input of flip/flop 810. The Q output of flip/flop 810 is the upper/lower (U/L) field type indicator.

A circuit 820 for detecting interlaced and noninterlaced signals is shown in FIG. 14. The circuit 820 comprises field type detector 800, D-type flip/flop 822 and exclusive or (XOR) gate 824. The inverted Q output of flip/flop 810 is the D input for flip/flop 822, which is enabled (EN) by the Q output of flip/flop 802. The inverted Q output of flip/flop 810 is the U/L field type indicator. The inverted Q output of flip/flop 810 and the Q output of flip/flop 822 are the input to the XOR gate 824. The purpose to the flip/flop 822 is to store the field type of the previous field. The XOR gate 824 compares the field type of the current field with the field type of the previous, stored field. If the field types are the same, the output of the XOR gate 824 will be LO, indicating a noninterlaced video source. If the field types are different, the output of the XOR gate 824 will be HI, indicating an interlaced video source.

The TV microprocessor 216 reads the status of the INTERLACED output signal over the serial TV bus. The microprocessor can determine, generally after changing to a new channel, whether the main video signal (with which the display is synchronized) is interlaced or noninterlaced. If the main video signal is interlaced, the pix-in-pix processor 320 can be instructed to operate by reading and writing every field of the auxiliary video signal. Interlace integrity can be maintained as explained in connection with FIGS. 7-11. If the microprocessor determines that the main video signal is noninterlaced, the pix-in-pix processor 320 can be instructed to write only every other field into the video RAM 350. Since only one field type is written, only one field type can be read out. Each such field is read out twice. The auxiliary channel is thereby converted to noninterlaced video. Such noninterlaced video results in a much more desirable picture as an auxiliary picture on a noninterlaced display than would an interlaced auxiliary picture.

What is claimed is:

1. An apparatus, comprising:
   video display means synchronized with a first video signal;
   means for detecting whether said first video signal has more than one field type;
   means for combining a second video signal having more than one field type with said first video signal in a simultaneous display on said video display means; and,
   video signal processing means responsive to said detecting means, having a first mode of operation when said first video signal has more than one field type, in which all fields of said second video signal are an output to said combining means for said simultaneous display, and having a second mode of operation when said first video signal has only one field type, in which only one field type of said second video signal is an output to said combining means for said simultaneous display.

2. The apparatus of claim 1, comprising means operable during said first mode of operation for maintaining interlace integrity of said second video signal with said display means.

3. The apparatus of claim 1, wherein said video signal processing means comprises means for synchronizing said second video signal with said first video signal.

4. The apparatus of claim 1, wherein said video signal processing means comprises means for storing said second video signal, only one field type of said video signal being written into and read from said storing means during said second mode of operation.

5. The apparatus of claim 4, wherein each field written into said storing means during said second mode of operation is read out twice to said combining means.

6. The apparatus of claim 1, wherein said video signal processing means comprises means for storing said second video signal, one field type of said video signal being written into storing means once and read out of said storing means twice during said second mode of operation.

7. The apparatus of claim 1, wherein said display means has a wide format display ratio.

8. The apparatus of claim 1, wherein said display means has a format display ratio of approximately 16:9.

9. An apparatus, comprising:
   video display means synchronized with a first video signal;
   means for detecting whether said first video signal is interlaced or noninterlaced;
   means for combining a second video signal having odd and even interlaced fields with said first video signal in a simultaneous display on said video display means; and,
   video signal processing means responsive to said detecting means, having a first mode of operation when said first video signal is interlaced, in which both odd fields and even fields of said second video signal are an output to said combining means for said simultaneous display and having a second mode of operation when said first video signal is noninterlaced, in which only all even fields or only all odd fields of said second video signal are an output to said combining means for said simultaneous display.

10. The apparatus of claim 9, comprising means operable during said first mode of operation for maintaining interlace integrity of said second video signal with said display means.

11. The apparatus of claim 9, wherein said video signal processing means comprises means for synchronizing said second video signal with said first video signal.

12. The apparatus of claim 9, wherein said video signal processing means comprises means for storing said second video signal, only every other field of said video signal being written into and read from said storing means during said second mode of operation.

13. The apparatus of claim 12, wherein each field written into said storing means during said second mode of operation is read out twice to said combining means.

14. The apparatus of claim 9, wherein said video signal processing means comprises means for storing said second video signal, every other field of said video signal being written into storing means once and read out of said storing means twice during said second mode of operation.

15. The apparatus of claim 9, wherein said display means has a wide format display ratio.

16. The apparatus of claim 9, wherein said display means has a format display ratio of approximately 16:9.

* * * * *